United States Patent

[11] 3,592,328

[72] Inventor Gordon K. Sapp
 Middletown, Ky.
[21] Appl. No. 881,812
[22] Filed Dec. 3, 1969
[45] Patented July 13, 1971
[73] Assignee Logan Co.
 Louisville, Ky.

[54] TRANSFER AND ORIENTING MECHANISM FOR ARTICLES
 8 Claims, 5 Drawing Figs.

[52] U.S. Cl. .................................................. 198/33 AB,
 214/6 P
[51] Int. Cl. ................................................... B65g 47/24
[50] Field of Search .......................................... 198/33 AB,
 76, 25; 214/6 P; 53/159

[56] References Cited
 UNITED STATES PATENTS
 3,420,385 1/1969 Verrinder ..................... 198/33 AB Primary Examiner—Edward A. Sroka
Attorney—John K. Crump ABSTRACT: A transfer and orienting means for articles such as cases, cartons, boxes and the like, comprising a live roller-type conveyor defining a support and conveyance surface for the articles and means for feeding articles having a uniform axial orientation onto one end of the conveyor in a path of travel 90° to the longitudinal axis thereof, including a power-operated, rotatable feed drum disposed immediately alongside the conveyor in direct article-feeding relation thereto. The articles in passing from the drum onto the conveyor are urged by the thrust or force of the latter to a position of axial orientation 90° from the original orientation of the articles and by varying the speed of the articles as they move onto the conveyor by varying the drum speed the articles are selectively caused to accede to the action of the conveyor and to turn through 90° in passing onto the conveyor or to override the action of the conveyor and to pass thereonto without change in axial orientation.

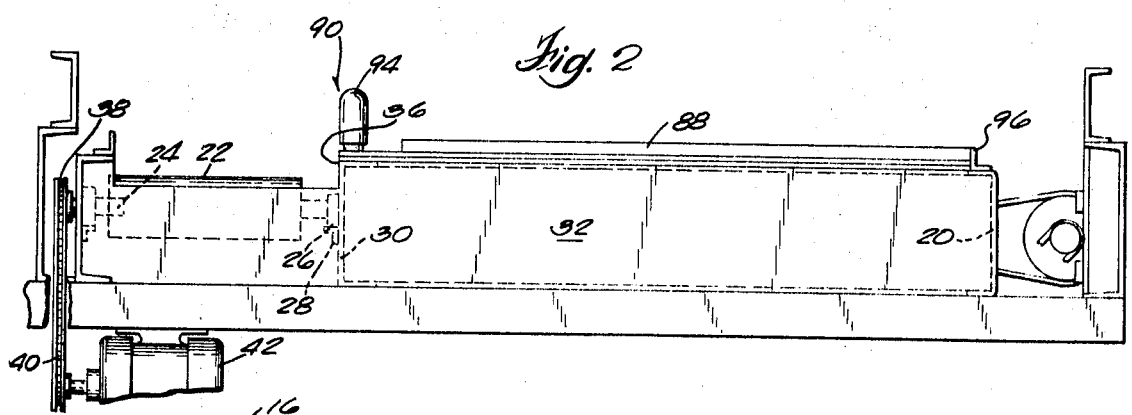
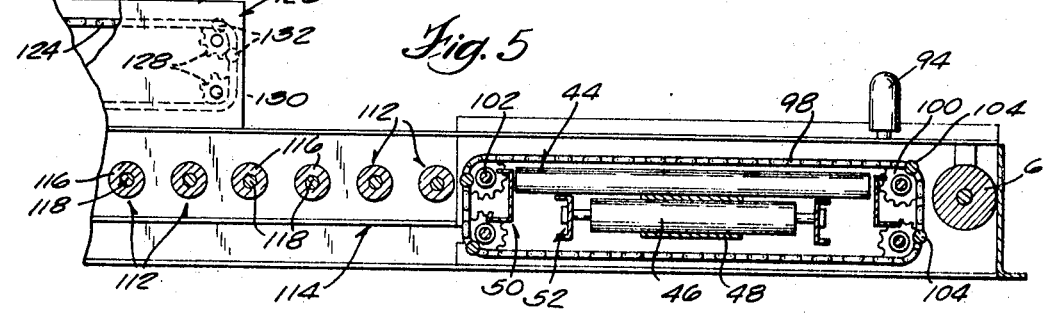
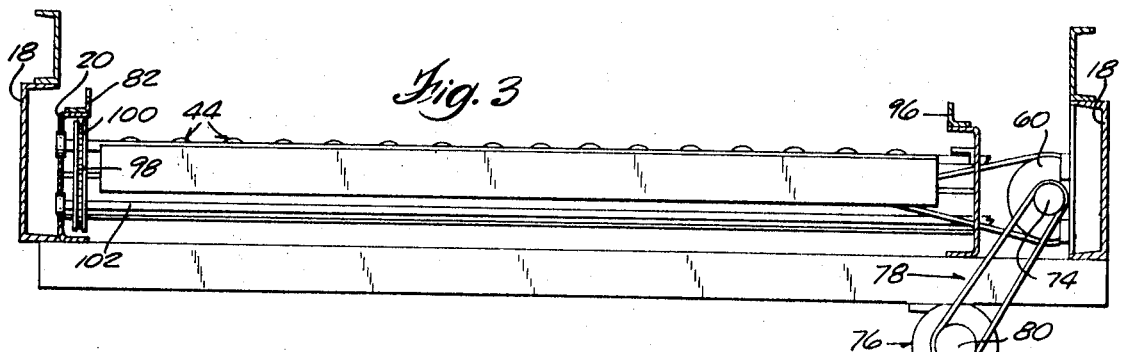
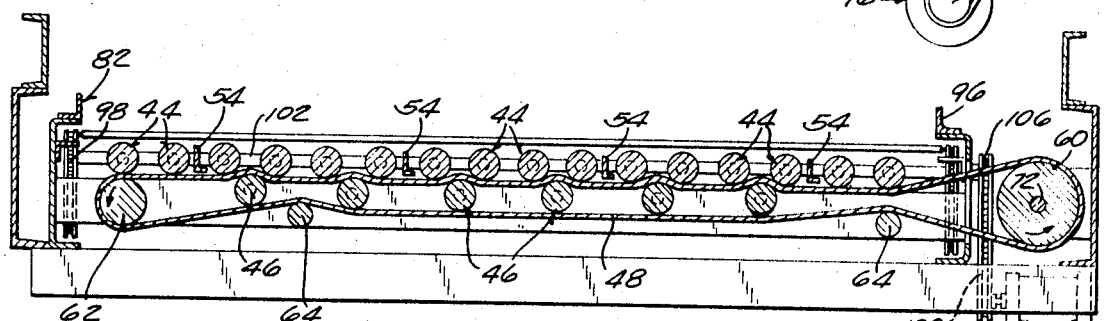

TRANSFER AND ORIENTING MECHANISM FOR ARTICLES

This invention relates to an orienting mechanism for articles of a generally parallelepiped configuration and more particularly is directed to mechanism for receiving articles having a uniform axial orientation and for advancing the same for further processing with either the same or a 90° change in axial orientation.

Mechanism of the present type has particular application to the forming or arranging of groups of generally parallelepiped articles, such as cases, cartons, crates, boxes, etc., into a predetermined pattern or series of patterns for subsequent handling in a palletizer, for example, for placement thereby on a pallet or other movable support platform in layered or stacked relation to one another. As is generally known, for purposes of pallet stability and/or article compactness in the separate pallet layers, the pattern or patterns normally employed in these palletizing operations call for selected ones or groups of the articles to be turned 90° to other of the articles in the pattern and, since the articles normally have a uniform axial orientation when received, provision must be made for effecting selective turning of the articles in the pattern-developing process.

While a variety of mechanisms have been developed for effecting this selective turning or orienting action, these prior proposals have been far from commercially satisfactory, being characterized by such things as a relatively complex, cumbersome construction, a slow, and in some cases, unreliable operation, and a limited capability of according the articles a smooth or gentle handling in the pattern-developing process. Reference is made, for example, to one widely used type of orienting or patterning mechanism and which is designed to provide a selective turning action of the articles being patterned through means of a movable abutment plate or stop arm adapted to be placed in the path of travel of the articles to effect through impact or contact therewith a 90° turning movement of the articles. In this type of device, the articles are subjected to rather substantial impact and shock loads in being patterned and in many instances, and particularly with articles of a frangible nature or having a decorative or ornamental packaging or exterior dress, the articles incurred physical injury or damage as an incident of the pattern-forming operation. Then too, in handling articles of appreciable mass, the device itself sustained rather heavy and repeated impacts and jarring in the patterning process and thus required a rugged, sturdy construction to sustain these loads over prolonged periods of use. This gave rise to a device of cumbersome and costly construction and one which was both inefficient of operation and prone to frequent malfunctionings in operation. These referred to problems have become particularly acute with the development of palletizers having increased operating speeds and capacities and which has in turn dictated a faster operation of the pattern former to match palletizer capacity.

As an alternative to this impact-type article-orienting means, it has been proposed to effect article orientation by feeding the articles at right angles onto a live roller-type conveyor having an elevationally movable grid assembly operatively mounted below or in the plane of the live rollers in interdigitating relation with the individual rollers thereof. The articles in feeding onto the live roller conveyor normally tend to turn 90° to their initial axial orientation under the driving action of the "live" rollers and, with the grid assembly in its normal, retracted position below or in the plane of the rollers, the turning action of the conveyor on the articles in unabated and the articles as a result thereof turn 90° in the course of completing movement onto the live roller conveyor. Where it is desired to retain the articles in their original position of axial orientation, the grid assembly is elevated above the plane of the live rollers immediately prior to the entry of an article thereon such that the article in passing onto the conveyor is received on the grid assembly, thus effectively nullifying the article-turning action of the live rollers. When the article is fully on the grid assembly, the latter is lowered back into or below the plane of the rollers, the article being set on the rollers in the process thereof for normal forwarding action along the conveyor.

While this alternative provides a somewhat smoother overall handling of the articles, the necessity of successively raising and lowering the grid assembly between selected of the articles limits the speed at which the device may be effectively operated and gives the device a somewhat restricted application. From a constructional standpoint, this alternative type of device is fairly complex, resulting in the further drawbacks of high cost and lack of operational reliability.

This invention is directed to a new and improved article orienting mechanism and which eliminates the aforementioned drawbacks and limitations of existing designs by feeding the articles at right angles onto a live roller conveyor or other transport means at one of two different lineal rates of movement designed, in the one instance, to cause the articles in moving onto the conveyor or other transport means to be turned thereby. 90° to the original position of the articles and, in the other instance, to enable the articles to retain their original axial orientation in moving onto the conveyor or other transport means.

In accordance with a presently preferred embodiment of the invention, a live roller-type conveyor has a rotatable drum or roller mounted along side one end of the conveyor for directing or feeding articles at right angles thereonto. The drum is powered independently of the conveyor through a two-speed drive motor and which for each successive article moving thereover and relatively toward the conveyor is set at the particular one of its two operating speeds as will provide the successive articles a desired rate of travel onto the conveyor and a desired axial orientation upon completing transfer movement thereto.

When used for pattern forming purposes, the live roller conveyor is provided with an end abutment or stop plate which limits the articles for movement along the conveyor and holds the articles thereon pending the forming of one row of the pattern. A flight-bar type sweep-out mechanism is associated with the conveyor for moving completed rows of the pattern from the conveyor and onto another live roller type conveyor which operates to consolidate the rows into a completed pattern.

There thus is provided a relatively simple, highly convenient means for effecting simultaneously with the movement or transfer of articles from one position or station to another the arranging of the articles in one of two positions of axial orientation. The lack in the present device of movable or shiftable stop arms or plates or other conveniently employed orienting or turning devices such as a lift assembly, for example, enables the articles to be handled in a relatively smooth, reliable manner and at rates of speed heretofore not practicably attainable due to mechanical limitations or to the susceptibility of the articles to injury or damage under rough handling conditions.

The above and other objects and advantages of the present invention will become apparent in the course of the following description of a presently preferred embodiment of the invention.

The drawings furnished herewith illustrate the best mode currently contemplated of carrying out the invention.

In the drawings:

FIG. 1 is an overall plan view of a pattern former mechanism incorporating the novel article orienting means of the invention, with successive positions of incoming articles in the two different operating modes of the orienting means being shown in phantom and with the final position of the articles in a completed pattern being shown in full to facilitate a clear understanding of the nature of the invention;

FIG. 2 is an elevation of the pattern former mechanism of FIG. 1 viewed along what may be regarded as the front or infeed end thereof, certain parts being shown in phantom for illustrative clarity;

FIG. 3 is a transverse section of the pattern former taken along the lines 3-3 of FIG. 1, illustrating details of the row makeup conveyor and the cooperating row sweep-out mechanism;

FIG. 4 is a similar transverse section of the pattern former, taken on the lines 4—4 of FIG. 1; and FIG. 5 is a side view of a fragmentary portion of the pattern former with the outer side rail of the pattern former framework removed and with certain parts shown in phantom to reveal details of interior construction.

Figure 1:
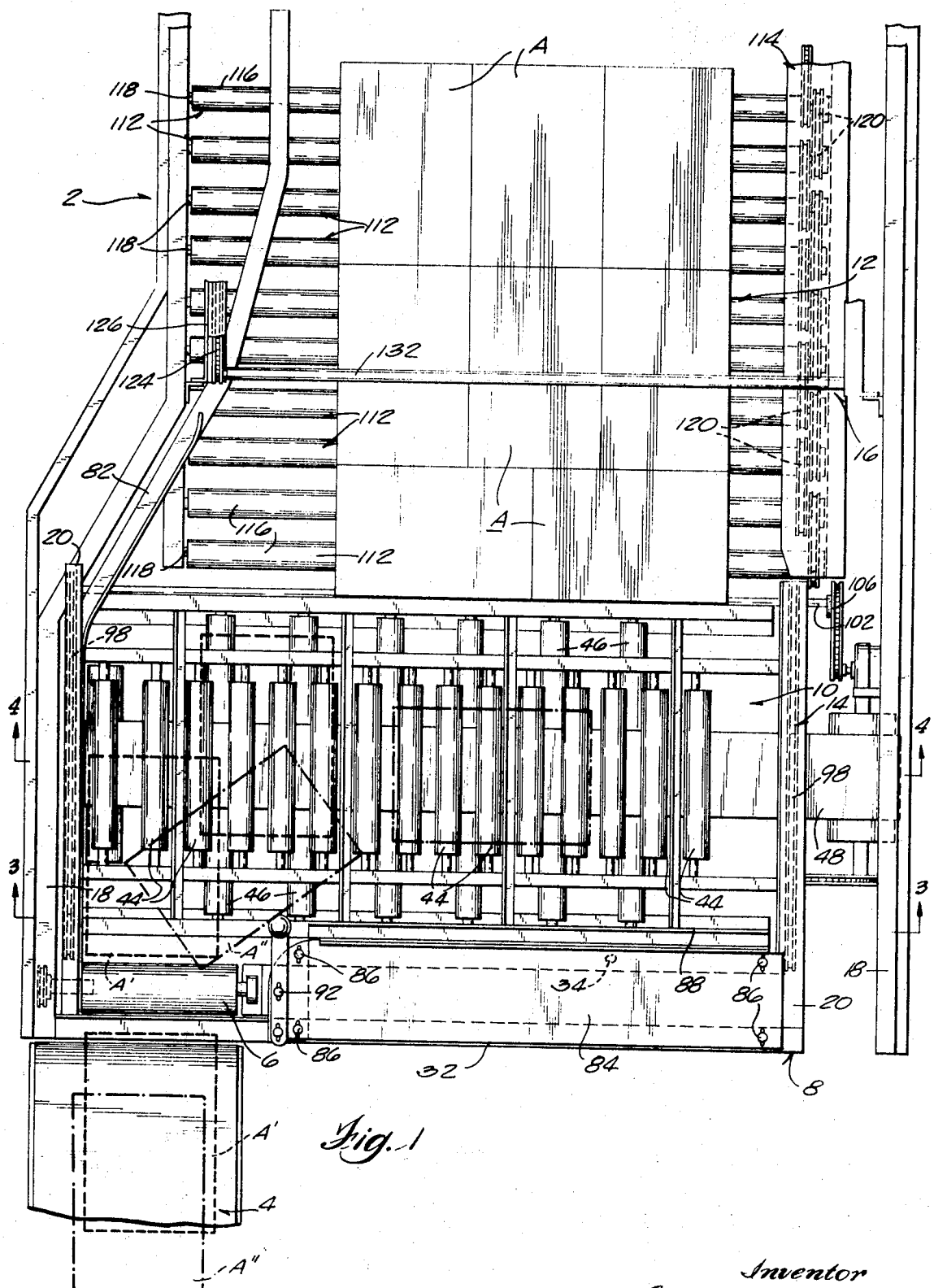

Referring now to the drawings, the novel article transferring and orienting means of the invention is shown as constituting an integral part of a pattern former 2 operating to arrange generally parallelepiped articles such as cases A of the type used to hold filled and crowned bottles of beer or a soft drink, for example, in a predetermined pattern or series of alternating patterns suitable for stacking or placement one on the other in layers by a palletizer or other stacking or tiering mechanism, not shown. The cases and which are shown herein to have sides of unequal length to enable a clearer understanding of the nature of the invention, are adapted to be delivered to the pattern former for processing in serialized, uniformly axially oriented relation to one another by conventional conveyor means and which includes a terminal braking conveyor 4 arranged along the front, left-hand end portion of the pattern former, as the latter is viewed in FIG. 3, in general parallelism with the longitudinal axis of the latter. In the illustrated example, the incoming cases have their longitudinal axes in parallelism with that of the braking conveyor and pattern former but this is by no means a requirement of the invention and the pattern former will operate equally well with the cases turned 90° to the position shown. As will be seen hereinafter, the proper operation of the pattern former calls for a controlled feed or delivery of the cases thereto and, while the particular means by which this is accomplished is not shown herein, it will be understood that the braking conveyor includes, for this purpose, conventional start-stop controls in its drive mechanism or suitable gating devices or the like for blocking case movement into the pattern former when and as required.

Generally speaking, in the improved pattern former of the invention, the cases or other articles are adapted to be initially received from braking conveyor 4 by a feed drum or roller 6 arranged transversely within a generally rectangular supporting framework 8 immediately adjacent the braking conveyor. The cases are adapted to be forwarded by the drum onto a live roller type accumulating conveyor 10, referred to hereinafter as the row makeup conveyor, disposed laterally in the front or upstream end portion of the framework and which functions to move the cases at right angles to their original path of travel and into a rowlike formation with one another on the conveyor. The cases are held on conveyor 10 pending the forming thereon of a row of the pattern and are subsequently swept laterally off the conveyor and relatively onto another live roller-type accumulating conveyor 12, referred to hereinafter as the pattern makeup conveyor, disposed longitudinally in the far or downstream end portion of framework 8 by a flight-bar-type sweep-out mechanism 14 operatively associated with row makeup conveyor 10. The pattern makeup conveyor 12 serves to consolidate the individual rows of cases or other articles into the final pattern and, similarly to the conveyor 10, has a flight-bar-type sweep-out mechanism 16, shown in part only, associated therewith for moving completed patterns of cases off the downstream end of the pattern former and into the palletizer or other stacking device with which the pattern former is employed.

Adverting now to a more detailed consideration of the improved pattern former of the invention, the aforesaid feed drum or roller 6 is supported in the front or upstream, left-hand end portion of framework 8, as the mechanism is viewed in FIG. 1, generally transversely to a pair of main channel section beams 18 constituting the sides of the framework and a pair of similar, but shorter, paralleling beams 20 disposed to the inside of the beams 18.

The drum which includes an outer cylinder or roller member 22 keyed or otherwise connected for rotation as a unit with a center axle or mounting shaft 24 is supported in part from the left-hand one of the beams 20 through means of a bearing assembly 26 carried on an angle plate 28 which is affixed to the inside of the aforesaid beam 20. The opposite or right-hand end of the drum is supported through another of the bearing assemblies 26 and angle plates 28 from a stub beam 30 arranged to left of center of the framework between a first transverse channel beam 32 extending across the front ends of the beams 18 and a second transverse channel beam 34 of shorter extent connected between the stub beam and the right hand of the inner side beams 20. The front beam 32 has a rectangular cutout portion 36 in the area of the feed drum to expose the upper portion of the drum for article engaging and driving action, it being understood that the upper peripheral portion of the drum lies in the horizontal plane of the braking conveyor and is in sufficiently close proximity therewith to enable the cases to "bridge" the gap between the drum and the braking conveyor.

The feed drum constitutes a positively driven element or member which, as will be explained more fully hereinafter, cooperates with accumulation conveyor 10 to cause selected of the cases to rotate or turn 90° about their vertical axes in passing onto the conveyor from the drum and, in order to facilitate this turning action, the cylinder or roller portion 22 of the feed drum is provided with a smooth or low-friction surface. The drive means for the feed drum includes a sprocket 38 mounted to an extension on the left-hand end of mounting shaft 24 and connected by a precision chain 40 to a gear motor unit 42 supported by suitable brackets along the left side of the frame.

The row makeup conveyor, as aforestated, is adapted to receive the cases or other articles directly from the feed drum and includes a series of upper carrying rollers 44 defining a laterally extending support and conveyance surface for the articles in the upstream end portion of the framework and a series of lower, tensioning rollers 46 which function to maintain an endless drive belt 48 in frictional driving engagement with the upper or carrying rollers. The rollers 44 and 46 are supported longitudinally in the main frame structure 8 within respective of the rectangular subframes or beds 50 and 52, the latter subframe being bolted or otherwise attached through its opposed end portions to the inner pair of side beams 20 and the former subframe being supported in superimposed relation on the subframe 52 through means of a series of transverse spacer bars 54 carried by subframe 52.

The carrying and tensioning rollers are substantially identically formed of an outer cylinder or roller 56 and a center support shaft or axle 58 freely rotatably mounting the rollers and having hexagonally configured end portions received in nonrotative relation within correspondingly shaped apertures in the opposed sides of corresponding of the sub frames 50 and 52. The carrying rollers are disposed in equispaced, parallel relation to one another along the length of subframe 50 in a common plane with one another and with the upper periphery of the feed drum while the tension rollers are arrayed in subframe 52 below and generally intermediately between each successive pair of the carrying rollers, also in a common plane with one another.

The drive belt for the carrying rollers is mounted lengthwise of the subframes and in circumscribing relation to tensioning rollers 46 between a powered, friction-drive roller 60 fixedly attached to the right hand of the main channel side beams 18 through conventional bearing assemblies and a return wall roll 62 journaled transversely in the left hand end of lower subframe 52. The upper pass or run of the belt is threaded between the carrying and tensioning rollers while the lower or return run of the belt extends along the underside of the tensioning rollers, being supported on a number of return rollers 64 rotatively mounted in lower subframe 52. The wall roll itself is preferably mounted for adjustment longitudinally of the lower subframe 52 through any conventional adjustable mounting structure to enable the belt tensioning to be controlled or adjusted to a limited extent.

The belt drive pulley includes a center support shaft 72 having a sprocket 74 on one end thereof and is adapted to be powered by a drive motor 76 located on the underside of the framework, through means of an endless chain 78 trained around the sprocket 74 and a power takeoff pulley or sprocket 80 associated with the drive motor. In the illustrated construction, the upper pass of the drive belt has a right-to-left movement so as to drive the carrying rollers in a clockwise direction and thereby cause the cases in moving onto the rollers from the feed drum to move in a left-to-right direction on the rollers.

The cases in passing from the drum onto and then along the row makeup conveyor are guided for movement by a series of plates or rails. A first such plate or rail, shown at 82, is connected to the upper flanged portion of the left-hand channel rail 20 to guide the articles properly onto the row makeup conveyor 10 from the feed drum. This plate has a curved inward extension projecting into the area of the pattern makeup conveyor relatively toward the center thereof to provide for a lateral compaction of the cases as they are consolidated into the final pattern, as will be more particularly described hereinafter.

Pivot and guide plate means are provided along the front portion of the row makeup conveyor to the right of feed drum 6 for engaging the cases as they move longitudinally thereof preparatory to being formed into a row. Specifically, a cover plate 84 is mounted along the top of the aforesaid transverse channel rails 32 and 34 in the front end portion of the framework as by bolt means 86 received in slotted apertures in the underlying 84 Plate 84 is flanged along its inner edge to define a guide rail 88 for the cases along the forward side of the row makeup conveyor. Mounted to the cover plate adjacent the feed drum is a generally L-shaped turning pin assembly 90 secured in place by bolt means 92 fitting within slotted apertures in the horizontal leg of the assembly and in registering apertures in cover plate 84. The vertical leg of the assembly is in the form of a rounded pin or post 94 and extends inwardly over the conveyor to engage and assist in the turning of selective of the cases during transfer movement thereto from the feed drum. A further guide or article-engaging means 96 is provided at the downstream end of the row makeup conveyor for limiting case movement longitudinally thereof. Guide 96 is mounted along the upper flanged portion of the corresponding side channel rail 20 in general parallelism with the lineal portion or section of the aforesaid guide 82 on the upstream end of the row makeup conveyor.

The aforesaid flight-bar-type sweep-out mechanism 14 associated with the row makeup conveyor operates laterally of the conveyor or longitudinally as respects the pattern former as a whole to sweep rows of cases from the conveyor onto the pattern makeup conveyor and includes, in general, a pair of endless precision chains 98 supported on sprockets 100 at either end of the row makeup conveyor in circumscribing relation with the subframes of the rollers. The sprockets are supported in the arrangement shown, i.e., in sets along what may be termed as the outside corners of the subframes, by means of shafts 102 which are journaled in suitable bearings carried on the inside of framework side rails 20. The chains have a double set of pusher or flight bars 104 located at diametrically opposed positions thereon and which are provided by the chains with a right-to-left, operating passover and horizontally of the carrying rollers whereby to engage and effect displacement of cases on the row makeup conveyor and a paralleling return or reverse pass along the underside of the tensioning rollers. The chains, in the present instance, are adapted to be driven through a drive sprocket 106 connected to an extension of the right-hand end of the mounting shaft 102 for the sprocket in the upper, right corner of the framework and which is connected in turn by an endless chain 108 to a drive motor 110 mounted in any suitable fashion to the right-hand side of the framework.

The pattern makeup conveyor includes a plurality of rollers 112 arranged transversely within the framework in equispaced, tandem relation to one another between a pair of opposed channel rails 114 located along the inside of the main side rails. The rollers 112 each include a roller member 116 collectively defining a support and conveyance surface for the cases in the same plane as that of carrying rollers 44, and a center shaft 118 having a journaled support in the rails. The roller shafts are extended through a common one of the frame side rails 114 to receive sets of sprockets 120 which are drivingly interconnected with one another through corresponding of the series of chain means 122. A suitable drive motor, not shown, is connected to a sprocket 120 of one of the mounting shafts 118 to drive the rollers in unison with one another to effect movement of the cases on the conveyor. The aforesaid curved guide plate 82 extends inwardly across the left hand of the channel rails 20 as shown and inwardly over the rollers 112 to provide a desired lateral compaction of the cases as they are moved onto the pattern makeup conveyor from row makeup conveyor 10.

Sweep-out mechanism 16 for the pattern makeup conveyor, shown in part only, comprises a pair of chains 124 extending longitudinally of a pair of opposed vertical plates 126 supported on rails 114 and supported on the plates by sprockets 128 arranged in sets on transverse mounting shafts 130. As in the case of flight bar mechanism 14, pairs of pusher bars 132 are connected to diametrically opposed portions of the chains for movement thereby in a right-to-left operating passover the conveyor and a return or reverse pass above the operating pass. The sweep-out mechanism 16 may be driven by a separate drive motor, not shown, or in a preferred construction, is coupled directly into the drive mechanism of the associated palletizer to facilitate synchronization therewith.

Referring now in detail to the novel means by which the cases are provided a desired axial orientation in the pattern, it is to be appreciated that with the described arrangement of the row makeup conveyor 10 and feed drum 6 the cases or other articles in moving onto the conveyor from the drum are subjected to opposing forces, or actions, one of which derives from conveyor 10 and tends to cause the cases to turn or rotate 90° about their respective vertical axes in moving off the drum and onto the conveyor and the other of which derives from the forward impetus or inertia imparted to the cases by the infeed means, including the drum 6, and which tends to cause the cases to retain their original axial orientation during transference to the conveyor 10. Generally, in the invention, the composite effect of these two forces or actions on the individual cases is controlled to produce for any particular article a desired axial orientation on the conveyor 10 and, in turn, in the final pattern by varying the speed, and hence the momentum, of the cases in moving onto the conveyor between predetermined values or ranges of values through corresponding variance in the rotational speed of the feed drum while maintaining the force or action exerted on the cases by the row makeup conveyor at a constant value.

The particular drum speeds or speed ranges required to produce the desired effect on the axial orientation of the cases during passage onto conveyor 10 from the drum is dependent upon a number of different factors such as, for example, the frictional characteristics of the drum, the rollers and the cases themselves, the mass, size and/or shape of the cases, the speed at which the rollers are driven, etc. and in actual practice some experimentation may be necessary to establish the proper speeds or speed ranges for the drum. In any event, in the invention, feed drum 6 is selectively operable through the gear motor 42 with which it is associated at either of two predetermined speeds or speed ranges, calculated to provide, on the one hand, a case speed which will result in the force of the row makeup conveyor 10 overriding the momentum of the cases as they move off feed drum 6 to effect a 90° turning motion thereof while providing, on the other hand, a case speed which will result in the momentum of the cases overriding the turning action of conveyor 10 as the cases move thereonto and in case transference without change in axial orientation. The particular settings required in gear motor 42 to produce the desired drum speeds or speed ranges depend upon the relative sizes of the sprockets associated with the gear motor and drum and, in any given application, once the correct drum speeds or speed ranges are determined the settings of the gear motor necessary to provide the desired drum speeds can readily be arrived at. The gear motor preferably is designed for normal operation at one of the two speeds or speed ranges found satisfactory and is provided with a suitable switch or other control designed to automatically place the gear motor in the other of its speeds or speed ranges when activated.

A pictorial representation of the movement of the cases onto conveyor 10 in the two modes of operation of the feed drum is provided in FIG. 1 of the drawings. With reference thereto, a case moving onto conveyor 10 from the drum with the latter being rotated or driven at the lower of the predetermined speeds or speed ranges is shown at (A') as undergoing an initial turning action towards the downstream end of the row makeup conveyor as the front portion of the case makes contact with the carrying rollers thereof. In a succeeding position of the case, a further turning action has taken place, with the case having progressed further onto the row makeup conveyor from the feed drum to the point where it is substantially at a 45° angle to the axis of the conveyor. In the next succeeding and last illustrated position, the case has substantially completed its movement from the feed drum onto conveyor 10 and, at this time, has substantially completed its turning motion to bring its longitudinal axis into parallelism with that of the conveyor and fully 90° removed from the original orientation during movement into the pattern former. It will be observed that the case at all times during such turning movement remains in contact along its side with pivot pin 94 of turn pin assembly 90 and is thereby confined to the conveyor and turned in a smooth and controlled arc.

A similar series of successive positions is provided for a case moving onto the row makeup conveyor from the feed drum when the latter is operated or driven at the higher of its predetermined speeds or speed ranges. In this instance, indicated at (A''), the case is traveling at a substantially increased rate of speed when it reaches the carrying rollers of the conveyor and is able to progress fully onto the rollers without any significant change in axial orientation, the force or driving action of the carrying rollers being effective only to slow the inertia of the case and to move the case relatively toward the downstream end of the conveyor.

To achieve necessary "gapping" of the successive cases feeding into the pattern former, "braking" conveyor 4 desirably is provided a lineal running speed which is somewhat less than the peripheral speed of the feed drum when gear motor 42 is at its lower speed setting. This assures the cases passing onto row makeup conveyor 10 from the feed drum 6 and assuming a desired position of axial orientation free of hindrance from ensuing or preceding of the cases irrespective of the lack of case to case spacing on the "braking" conveyor and/or in the upstream case feed conveyors.

In the actual forming of a pattern in the above described structure, the gear motor of feed drum 6 is programmed through a suitable control or operating circuit to function in a selected one of its two speeds or speed ranges for each successive case moving relatively onto the braking conveyor and prior to the case actually passing onto the drum so as to provide the particular axial orientation required of the cases in the final pattern. Thus, for example, in the instance where it is desired to form the cases into a 3×3×2 pattern, that is, a pattern having two identical rows of three, uniformally axially oriented cases each and a third row of two cases turned 90° to the cases in the other two rows such as is illustrated in FIG. 1, gear motor 42 would run at the higher of its two speeds or speed ranges for the cases or other articles in the first two rows and at the lower of its speeds or speed ranges for the cases or other articles in the last row. Generally, the sequential switching of the gear motor to and between its operating speeds would be controlled by the cases or articles themselves through means such as a photocell, limit switch or the like positioned to sense each successive case as it moves onto or past a predetermined point on the "braking" conveyor and operatively connected to suitable speed controls for the gear motor to provide the proper speed setting thereof as the cases progress towards the feed drum.

Insofar as the operation of the other components of the pattern former is concerned and again referring to the instance in which the pattern under formation is of a 3×3×2 arrangement, the cases in moving onto row makeup conveyor 10 are moved thereby in a desired position of axial orientation relatively toward the downstream end of the conveyor, with the first such case in any row engaging and coming to a position of rest against the guide rail 96 and the ensuing cases moving to position or rest on the conveyor in abutment with one another. As a row of the pattern is completed on the conveyor or in the present instance after the third, sixth and eighth cases have moved onto and along the length of conveyor 10, sweep-out mechanism 14 is actuated to cause the cases to be moved onto the rollers 112 of pattern makeup conveyor 12. At this time, the feed of cases into the pattern former is interrupted to enable the sweep-out action to occur without interference from ensuing cases entering the pattern former. In actual practice, the sweep-out mechanism 14 preferably is actuated as soon as the last case in any particular row enters onto the row makeup conveyor and prior to movement fully against the other cases in the row as this will reduce the period of interruption in case feed to the pattern former between rows and thereby provide the pattern former a somewhat increased article handling capacity. In this "early" actuation of the sweep-out mechanism 14, the last case in the rows will be brought into properly abutted relation with the other cases by the combined action of the curved plate 82 and the row makeup conveyor itself as the cases are being swept laterally off the latter conveyor. For this same purpose of increased capacity in the pattern former, case feed into the pattern former between rows may be resumed prior to the transfer of a completed row onto the pattern makeup conveyor, preferably being resumed at the point where the particular one of the pusher bars of sweep-out mechanism 14 which is operative or in engaging position with respect to the cases can complete movement to the inner end of the carrying rollers in the interval of time between resumption of case feed to the pattern former and movement of the cases from a position on the braking conveyor to a position fully on conveyor 10. Here again, the starting and stopping of sweep-out mechanism 14 in properly sequenced or phased relation to case feed into the pattern former will normally be provided by suitable instrumentation and circuitry arrangements, the selection and design of which are believed to be matters largely within the province of a mechanic having ordinary skill in the art to which this invention relates.

The individual rows of the pattern in being swept from the row makeup conveyor 10 by sweep-out mechanism 14 pass directly onto the rollers 112 of the pattern makeup conveyor 12 which then moves the cases relatively towards the downstream end of the latter conveyor. The sweep-out mechanism 16 of conveyor 12 is, at this stage of the pattern forming cycle, in a static or stopped condition with one pair of the flight bars 104 in a case obstructing position at the downstream end of the conveyor and the other pair of flight bars in an elevated position at the upstream end of the conveyor. Thus, the first row of cases will be moved into abutment with the downstream pair of pusher bars 104 as it is transferred onto the pattern makeup conveyor and the second and third rows will in turn be advanced to positions of abutment with the cases of the first and second rows respectively. After the third row of cases has progressed onto rollers 112 of pattern makeup conveyor 12, the sweep-out conveyor associated therewith is actuated to effect through progressive and continuous movement of the upstream pair of pusher bars from a position above and behind the cases to a final position at the downstream end of the conveyor 12 the transfer of completed pattern of cases to the palletizer or other stacking or tiering apparatus associated with the pattern former. The pusher bar previously in a case blocking position at the downstream end of conveyor 12 moves in a reverse fashion to the other bar during sweep-out of the completed pattern to provide for sweep-out of the next completed pattern. The sweep-out mechanism 16 is stopped when the pairs of flight bars 104 have reversed their original positions along the opposite ends of conveyor 12. Again, it will be understood that suitable provision is made in the control or operating circuit of the pattern former to start sweep-out mechanism 16 for operation when the last row of the pattern has been moved onto the pattern makeup conveyor from the row makeup conveyor and for stopping operation when the pairs of flight bars have reversed positions along the length of the pattern makeup conveyor. It should be noted that the operation of sweep-out mechanism 16 and the movement of completed patterns off the pattern makeup conveyor may take place concurrently with the forming on the row makeup conveyor of the first row of cases in the next ensuing pattern and thus there is no need for prolonged interruption in article feed to the pattern former between successive full pattern forming cycles.

From the above description, it can be seen that a relatively simple and operationally smooth mechanism is provided for arranging articles having a uniform axial orientation into a desired grouping or pattern having selected ones or groups of the articles axially oriented 90° to other of the articles in the group or pattern. Shocks and impact forces on the articles from contact of the moving articles with stationary abutment or stop plates and the like are eliminated as is the need for relatively slow acting, operationally unreliable lift devices in the plane of the support and conveyance surface of the articles for controlling the axial orientation of the articles, enabling a relatively gentle or "soft" handling of the articles and a greater all-around capacity in terms of the number of articles which can reliably be patterned in a given operating period.

While described as effecting a selective axial orientation of moving articles for purposes of forming a predetermined pattern of a group of the articles, the novel structure of the invention may be utilized whenever it is desired to effect the reorientation or selective orientation of individual ones of a series of generally parallelepiped articles being conveyed or moved from one processing machine or station to another to enable a desired operation or process to be performed or carried out by such latter machine or station. Under such conditions, the machine or station would be operatively connected directly to the downstream end of the row makeup conveyor or other transport means and the articles would continue movement from the downstream end of the row makeup conveyor after moving thereonto from the feed drum.

I claim:

1. A transfer and orienting means for parallelepiped articles, comprising a transfer conveyor having a plurality of parallel-extending rotatable means defining a support and conveyance surface for the articles, and means for feeding articles onto one end of the transfer conveyor in a direction generally 90° to the longitudinal axis of said conveyor, said means including a power driven feed drum disposed in parallelism with the longitudinal axis of the conveyor, means for driving said drum at one of two predetermined speeds, one of said predetermined speeds causing the articles in moving over said feed drum and onto said transfer conveyor to turn 90° to the original axial orientation of said article during infeed and the other and higher of said speeds causing the articles in moving onto said transfer conveyor from said feed drum to retain its original axial orientation, and means for operating said feed drum at a selected one of said two predetermined speeds for each successive article moving relatively towards said drum to provide a desired axial orientation to said articles on said transfer conveyor.

2. A transfer and orienting means for generally parallelepiped articles, comprising a transfer conveyor having a plurality of tandemly arranged, positively driven roller means defining a support and conveyance surface for the articles, and means operating normally to said conveyor for delivering an article at a time to said conveyor, said means including a rotatable drum mounted for rotation on an axis paralleling the longitudinal axis of conveyance surface defined by said roller means, drive means for said roller means and operable to rotate said roller means at one of two predetermined speeds, one of said speeds resulting in a 90° turning motion of the articles about the vertical center axis thereof in the course of the article moving onto said transfer conveyor and a second and higher of said predetermined speeds resulting in the article moving onto said transfer conveyor without rotational movement, and means for operating said feed drum at a selected one of said two predetermined speeds for each successive article passing relatively towards said transfer conveyor to effect a desired axial orientation of the articles on said transfer conveyor.

3. The construction of claim 2 wherein said feed drum is mounted in contiguous relation with a portion of said transfer conveyor.

4. The construction of claim 3 including an upright pivot post mounted on the inside corner defined by the juncture of said conveyor means and said feed drum for engaging those articles undergoing turning action in moving onto said transfer conveyor and for assisting in such turning action.

5. A combination conveying and orienting means for generally parallelepiped articles, comprising a powered transfer conveyor defining a support and conveyance surface for the articles, and infeed means operating 90° to said transfer conveyor and directly opposite an upstream portion thereof, in direction of article movement, for delivering articles to said conveyor, said articles being uniformly axially oriented on said infeed means and prior to passing said conveyor, said infeed means including a feed drum disposed normally to and adjacent said transfer conveyor, and drive means for powering said feed drum at one of two predetermined rates of speed, one of said speeds resulting in an article turning 90° on its vertical axis in moving from said feed drum onto said transfer conveyor and the other of said speeds resulting in the articles moving onto said transfer conveyor from said feed drum without change in axial orientation.

6. The construction of claim 4 wherein the feed drum has a relatively smooth, low friction outer surface to facilitate a selective turning action of the articles in moving onto said transfer conveyor from said feed drum.

7. An orienting mechanism for generally parallelepiped articles, comprising a conveyor having a plurality of tandemly arranged, power-driven roller means defining a longitudinally extending support surface for the articles, a feed drum for delivering articles onto said conveyor, said drum located in substantially contiguous relation with a portion of said conveyor and mounted for rotation on an axis paralleling the longitudinal axis of the support surface defined for the articles by said roller means, means for driving said feed drum at different predetermined rates of speed including at lest a first rate of speed designed to cause the articles in moving onto said conveyor from said feed drum to turn 90° about a vertical axis through the center of the articles and a second rate of speed designed to cause the articles to move from said feed drum onto said conveyor without rotational movement and means for driving said feed drum at a selected one of said first and second predetermined speeds for each successive article moving onto said feed drum and relatively towards said conveyor whereby to cause the articles in proceeding along the transfer conveyor to have a predetermined axial orientation.

8. A combination transfer and orienting mechanism for generally parallelepiped articles, comprising a transfer conveyor having a plurality of parallel-arranged roller means defining a substantially planar support and conveyance surface for the articles, and a two-speed, power-driven drum means arranged in contiguous relation to and normally of the roller means of said transfer conveyor, said drum means serving to deliver successive articles onto said transfer conveyor and coacting with said transfer conveyor when driven at a first rate of speed to cause a 90° turning action in the articles during transfer from said drum means to said roller means and at the same time coacting with said transfer conveyor when driven at a second higher rate of speed to prevent rotation of the articles in being transferred from said drum means to said transfer conveyor.